(12) United States Patent
Aulicino (10) Patent No.: US 7,195,301 B2
(45) Date of Patent: Mar. 27, 2007

(54) ROLL UP RAMP SYSTEM

(76) Inventor: Kenneth M. Aulicino, 8 Fenner Dr., Newton, NJ (US) 07860

( * ) Notice: Subject to any disclaimer, the term of this patent is extended or adjusted under 35 U.S.C. 154(b) by 99 days.

(21) Appl. No.: 11/089,731

(22) Filed: Mar. 25, 2005

(65) Prior Publication Data

US 2006/0214455 A1 Sep. 28, 2006

(51) Int. Cl.
*E01D 19/04* (2006.01)
*B65G 69/30* (2006.01)
*B60P 1/43* (2006.01)

(52) U.S. Cl. .................. 296/61; 14/69.5; 414/537

(58) Field of Classification Search .............. 296/50, 296/51, 57.1, 60, 61, 62; 14/69.5, 71.1; 160/133, 160/211; 414/537, 921, 430, 480
See application file for complete search history.

(56) References Cited

U.S. PATENT DOCUMENTS

| | | | |
|---|---|---|---|
| 288,455 A | 11/1883 | Landes | 182/164 |
| 1,004,575 A | 10/1911 | Jones | 59/78 |
| 1,570,014 A | 1/1926 | Stevens | 474/228 |
| 2,424,320 A | 7/1947 | Kilbourn | 66/156 |
| 2,602,345 A | 7/1952 | Braumiller | 74/251 |
| 3,586,393 A | 6/1971 | Myers | 305/35 R |
| 4,024,595 A | 5/1977 | Brown | 14/1 |
| 4,596,417 A * | 6/1986 | Bennett | 296/61 |
| 4,979,867 A * | 12/1990 | Best | 414/537 |
| 5,312,148 A * | 5/1994 | Morgan | 296/61 |
| 5,347,672 A | 9/1994 | Everard et al. | 14/69.5 |
| 5,400,733 A * | 3/1995 | Richter | 114/258 |
| 6,059,344 A * | 5/2000 | Radosevich | 296/61 |
| 6,079,072 A | 6/2000 | Katsiri | 14/2.4 |
| 6,463,613 B1 | 10/2002 | Thompson | 14/69.5 |
| 6,643,878 B2 | 11/2003 | Schmaltz et al. | 14/69.5 |
| 6,722,721 B2 | 4/2004 | Sherrer et al. | 296/61 |
| 6,837,669 B2 * | 1/2005 | Reed et al. | 414/537 |
| 6,928,959 B1 * | 8/2005 | Trauernicht et al. | 119/847 |
| 7,082,637 B1 * | 8/2006 | Griffin | 14/69.5 |
| 2002/0088065 A1 | 7/2002 | Schmaltz et al. | 14/69.5 |
| 2002/0145300 A1 * | 10/2002 | Webber | 296/61 |
| 2004/0032142 A1 * | 2/2004 | Sherrer et al. | 296/61 |
| 2006/0123568 A1 * | 6/2006 | Zhang | 14/69.5 |

\* cited by examiner

*Primary Examiner*—D. Glenn Dayoan
*Assistant Examiner*—Paul Chenevert
(74) *Attorney, Agent, or Firm*—Ernest D. Buff & Associates, LLC; Ernest D. Buff; Margaret A. LaCroix (57) ABSTRACT

A roll up ramp system facilitates transition between a first elevation and a second, higher elevation. The roll up ramp system includes a securement device temporarily connecting a roll up ramp to the second, higher elevation. Further included by the roll up ramp system are a plurality of links formed by a set of parallel plates interconnected by a central support rod and a pair of lateral locking rods. Each of the locking rods is provided with a plurality of selvedge linking units having a locking portion and a pivot portion. The links are interconnected by a plurality of linking support rods, which are accommodated by each of the selvedge linking units to form a roll up ramp. A rigid, durable ramp configuration is thereby achieved. The roll up ramp system is lightweight, strong, conveniently stored in a rolled up condition and readily deployed in an unrolled, ramp-like configuration to facilitate loading and unloading of equipment from a hauling vehicle.

22 Claims, 4 Drawing Sheets

ROLL UP RAMP SYSTEM

BACKGROUND OF THE INVENTION

1. Field of the Invention

The invention relates to a roll up ramp system for loading and unloading machinery from a hauling vehicle; and more particularly, to a ramp system that can be rolled up for storage and unrolled to form a durable, rigid ramp capable of releasable attachment to the hauling vehicle.

2. Description of the Prior Art

Today's active society calls for the hauling and transporting of a variety of equipment and machinery, such as lawn mowers, snow blowers, snow mobiles, JET SKI™s (personal watercrafts (PWCs)), ATVs and the like. Loading machinery of this kind, which is generally heavy and cumbersome in nature, into a hauling vessel, such as a truck or wagon, is often times difficult and tiresome. To avoid actually lifting the machinery, which might require several persons, ramp structures are widely utilized. Foldable or collapsible ramp structures provide an especially convenient means for loading machinery into the hauling vessel. After the machinery is loaded into the vessel, the ramp structure can be folded or collapsed for storage.

Foldable or collapsible ramp structures heretofore disclosed and utilized are bulky by nature and design. That is to say, many of the foldable or collapsible ramps generally have a paneled arrangement. The paneled portions are folded on top of one another to form a folded configuration. Other foldable or collapsible ramps generally have multiple ramp spans or slats that interlock by way of ramp links or flexible straps. These ramp structures have common disadvantages. They are generally cumbersome to arrange in both the ramp and folded configurations, and they are heavy. Still other designs utilizing chain-linking configurations that lock to form bridges or ladders provide inadequate support. They are inconvenient to use, and are frequently incapable of supporting heavy loads. Furthermore, the ramp structures heretofore disclosed and utilized do not enable convenient secure attachment to the hauling vessel. For example, many of the ramp structures heretofore disclosed and utilized provide for securement of the ramp to the hauling vessel by way of a magnetic portion, a hinge, or through friction via application of a non-skid surface.

Many of the foldable or collapsible ramp structures heretofore disclosed and utilized have a tendency to be bulky and heavy due to the panel arrangement utilized when forming the ramp. For example, U.S. Pat. No. 5,347,672 to Everard et al. discloses a portable, stow-able knock-down ramp structure having several elongated tread plates pivotally connected together to form a ramp configuration and visa vie a rolled-up configuration. U.S. Pat. No. 6,079,072 to Katsiri discloses a foldable and rigidizable space spanning structure including a frame assembly having a pair of spaced poles and a number of hinged sections aligned so that the poles and material can be folded in sections. U.S. Pat. No. 6,722,721 to Sherrer et al. discloses a foldable pickup truck tailgate and ramp device having a series of rigid panels interconnected by hinge means so that the panels are capable of folding up into a pickup tailgate assembly configuration. U.S. patent application Ser. No. 2002/0088065 to Schmaltz et al. discloses a loading ramp structure having a plurality of relatively small rectangular links joined end to end to form a desired length and adapted to form a rigid ramp and to be rolled-up for storage. None of these references disclose a ramp configuration comprising a plurality of links formed of a lightweight rod construction that enables the ramp to be lightweight and easily rolled for storage.

Various foldable or collapsible ramp structures heretofore disclosed and utilized have multiple ramp spans or slats that interlock by way of ramp links or flexible straps. Like the paneled arrangement ramps, these ramps have a tendency to be bulky and heavy due to the nature of the links utilized in the configuration. In particularly, U.S. Pat. No. 6,463,613 to Thompson discloses a portable ramp having a central load-bearing portion formed by several lightweight, transversely positioned slates that are pivotally connected to one another by several flexible straps. A pair of strong, lightweight braces rotates into a longitudinal position along the ramp sides to form rigid support of the central ramp portion. U.S. Pat. No. 6,643,878 to Schmaltz et al. discloses a loading ramp device comprised of a plurality of relatively small rectangular links that are jointed end to end to form a ramp that can be rolled up for storage.

Chain linking configurations that link and lock to form ladders, bridges, or chains have heretofore been disclosed and utilized, however, theses apparatuses do not provide support and ready convenience, and may not be capable of supporting heavy loads. U.S. Pat. No. 288,455 to J. K. Landes provides a folding ladder formed by a series of sections pivoted to each other by rungs and having spring-hooks or clamping-frames for locking the sections together to form a ladder. U.S. Pat. No. 1,004,575 to Jones discloses a flat link chain having aligning elements that are hingedly connected together by pins. The pins are adapted to cooperate with notched out parts on each of the elements. U.S. Pat. No. 1,570,014 to Stevens discloses a sprocket chain having central links with pivot openings and side links, which are held in connection with the central links by pivot pins in the usual manner. U.S. Pat. No. 2,424,320 to Kilbourn provides a chain having parallel selvedge chains built up of flat, "figure 8" form pressed steel links that are pierced with a pivot hole and having cross bars which extend across from one selvedge chain to the other. U.S. Pat. No. 2,602,345 to Braumiller discloses a chain link and chain device formed therewith. Side links with a semicircular projecting nose are connected to axial openings of rollers using rivet pins. The side links are configured so that when the chain is straightened resistance to flexing in one direction is achieved. U.S. Pat. No. 3,586,393 to Myers discloses a conveyor structure including a pair of chains having a plurality of links in the form of shoes, cross-pins and side links that are connected to and carried by the cross-pins. U.S. Pat. No. 4,024,595 to Brown discloses a linkage bridge consisting of a plurality of links rotate-ably coupled in an end-to-end relationship to form an elongated structural platform with a rotational stop between each adjacent link. None of these references disclose a ramp configuration that is comprised of a plurality of links formed of a lightweight rod construction that enables the ramp to be lightweight and easily rolled for storage.

Significantly, none of the foldable ramps or chain, ladder, or bridge structures provides a roll up configuration that is capable of supporting heavy loads when placed in the straight or ramp formation, and which is additionally capable of being rolled up for storage. None of the ramps disclosed or utilized provides a ramp structure that is capable of handling heavy loads associated with equipment, including lawn mowers, JET SKI™s (personal watercrafts (PWCs)), snowmobiles, ATV s and the like.

For the foregoing reasons, there exists a need in the art for a ramp system capable of being readily rolled up for convenient storage and which, when unrolled, readily forms a ramp having strength sufficient to carry heavy loads. Specifically, there exists a need in the art for a roll up ramp system that provides a durable rigid ramp configuration adapted for loading machinery, such as lawn mowers, snow blowers, JET SKI™s (personal watercrafts (PWCs)), snowmobiles, ATV s and the like, into a hauling device, such as a truck. Additionally, there is a need in the art for a roll up ramp system having a plurality of links interconnected to form a roll up ramp that is provided with rotation capability between each of the links, so that the links can be folded on top of one another to from a roll up configuration when force is applied. Moreover, there is a need in the art for a ramp system capable of achieving a ramp configuration with exertion of minimal force. For the forgoing reasons there exists a need in the art for a roll up ramp system that is lightweight, strong, conveniently stored in a rolled up condition and readily deployed in an unrolled, ramp-like configuration to facilitate loading and unloading of equipment from a hauling vehicle.

SUMMARY OF THE INVENTION

The present invention provides a lightweight ramp system that is readily rolled up for convenient storage and which, when unrolled, facilitates transition between a first elevation and a second, higher elevation, such as the tailgate of a land vehicle, the landing associated with a flight of stairs, the top of a loading dock, or the like. When placed in the unrolled condition, the system forms a ramp that is strong enough to effect loading and unloading of power equipment from a hauling vehicle. The roll up ramp system includes a securement device, a plurality of links, a plurality of selvedge linking units, and a plurality of linking support rods. The securement device is adapted for temporarily attaching the roll up ramp system to the tailgate portion of the hauling device. Hauling devices include such devices as pickup trucks, sport utility vehicles, box trucks, and the like. The links have top and bottom surfaces. Each link is formed by a set of parallel plates interconnected by a central support rod and a pair of lateral locking rods, which extend between the set of parallel plates. Each of the parallel plates further comprises a left end and a right end with a linking aperture located on each of the left and right ends thereof.

A plurality of selvedge linking units having a locking portion and a pivot portion are included by the roll up ramp system. The pivot portion has a pivot aperture. Each of the selvedge linking units is fixed within the linking apertures that are located on the left and right ends of each of the parallel plates. These selvedge linking units are adapted to rotate in an extended position and a roll up position. The locking portion of each of the selvedge linking units is adapted to receive each of the lateral locking rods when the selvedge linking units are in the extended position. Additionally, the locking portion of each of the selvedge linking units is adapted to release each of the lateral locking rods when the selvedge linking units are in the roll up position. Depending on weight requirements of the roll up ramp system, the locking portion may have more than two locking members, and the links may have more than two parallel plates. For ramp systems appointed to support heavy loads, there may be as many as 4 plates in each link.

The roll up ramp system further comprises a plurality of linking support rods that are received within the pivot aperture of the pivot portion of each of the selvedge linking units. These linking support rods interconnect each of the links to form a roll up ramp. The roll-up ramp is adapted to form a ramp configuration and a roll up configuration when a force is applied. The links adapt to fold over one another when the selvedge linking units are in the roll up position when force is applied.

The ramp configuration of the roll up ramp system is achieved when force is applied to the top surfaces of the links. As the force is applied to the top surface of each of the links, the selvedge linking units become engaged and assume the extended position. In the extended position, the locking portion of the selvedge linking unit is received by each of the lateral locking rods to form the ramp configuration.

The roll up configuration of the roll up ramp system is achieved when force is applied to the bottom surfaces of the links. With application of force to the bottom surface of each of the links, the selvedge linking unit rotates and its locking portion is released by each of the lateral locking rods. As the selvedge linking units rotate, the links fold over one another to form the roll up configuration.

The securement device comprises a heavy duty interwoven cloth material adapted to be tied under the tailgate portion of the hauling device. Alternatively, the securement device comprises a left and right hook composed of a steel, metal, or plastic material. In this embodiment, the hooks are adapted to be temporarily hooked under the tailgate portion of the hauling device. The securement device may also be wrapped around the tailgate of the vehicle and attached to the underside of the ramp.

Optionally, the roll up ramp system further comprises an inner support system. This inner support system is interconnected between the central support rods, the lateral locking rods, and the linking support rods. The inner support system further extends between the set of parallel plates and through the plurality of links, and extends throughout the roll up ramp system. A primary function of the inner support system is to provide traction for loading. The inner support system may be a unilateral inner support system, composed of a heavy duty interwoven cloth material. On the other hand, the inner support system can be a dual inner support system. The dual inner support system is comprised of dual supports running parallel to one another and being composed of a heavy duty interwoven cloth material. Alternatively, the inner support system is composed of an interwoven metal mesh material. Optionally, the inner support system is composed of an interwoven polymeric material. In a preferred embodiment of the roll up ramp system, additional traction is provided by a traction surface attached to the top of the links.

The roll up ramp system is composed of a lightweight metal or plastic material. This lightweight structure enhances the convenience factor of the roll up ramp system. As a result, the lightweight, durable, ramp structure can be readily rolled up for storage and easily deployed from a rolled up condition to a ramp configuration. It can be readily adapted for use as temporary ramping for wheelchair access to non compliant buildings. For example, the roll up ramp system can be placed on stairs to accommodate wheelchairs as a temporary fix.

The roll up ramp system is comprised of a dual ramp system having dual roll up ramps. Each of the dual roll up ramps has a width ranging from ½–2.5 feet. Alternatively, the roll up ramp system can comprise a unitary ramp system. Such a unitary ramp system comprises a unitary roll up ramp that has a width ranging from 2–6 feet.

The roll up ramp system is adapted to support a load associated with machinery selected from the group consisting of a lawn mower, rotary-tiller, fertilizer spreader, snow blower, snow mobile, JET SKI™s (personal watercrafts (PWCs)), or an all terrain vehicle. It can also be adapted to accommodate larger equipment such as land vehicles. Optionally, the roll up ramp system further comprises a storage bag adapted for housing the roll up ramp when the roll up ramp is in the roll up configuration.

Each of the plurality of links comprising the roll up ramp system has a length ranging from ¼–1 feet. Preferably, each of the links comprising the roll up ramp system has a length ranging from ½–¾ feet. The central support rods, lateral locking rods, and linking support rods may be coated with a non-skid surface material. Alternatively, the central support rods, lateral locking rods, and linking support rods may have treaded grooves thereon. The non-skid surface material and treaded grooves serve to cause friction between the roll up ramp system and an object, such as a lawnmower, snow blower or the like, traversing the system, thereby providing optimum loading capability and minimizing slippage.

BRIEF DESCRIPTION OF THE DRAWINGS

The invention will be more fully understood and further advantages will become apparent when reference is had to the following detailed description, appended claims, and accompanying drawings, in which:

DESCRIPTION OF THE PREFERRED EMBODIMENTS

The present invention provides a roll up ramp system for facilitating transition between a first elevation and a second, higher elevation, such as a tailgate portion of a land vehicle, the landing associated with a flight of stairs, a loading dock, or the like. Generally stated, the roll up ramp system comprises a securement device, a plurality of links, a plurality of selvedge linking units, and a plurality of linking support rods. These elements are arranged to form a roll up ramp adapted to form a ramp configuration and a roll up configuration as force is applied. The ramp configuration of the roll up ramp system is achieved when force is applied to the top surface of each of the links. The roll up configuration of the roll up ramp system is achieved when force is applied to the bottom surfaces of the links.

Chain link rigidity is provided when the links are flexed in one direction but not for the opposing direction, whereupon a flexible connection is achieved. As a result, the chain structure has sufficient flexibility to be folded, for storage convenience, when the selvedge links are not engaged. When the selvedge links are in the locked configuration the ramp structure acquires sufficient rigidity to securely hold heavy objects, which traverse the connecting rods supported by metal chain links during loading of an object into the bed of a hauling device. Advantageously, the ramp system provides a ramp that is readily attachable to various vehicles, such as trucks, that are utilized in hauling machinery or heavy objects. In particular, utilization of the ramp system facilitates the transporting of lawn mowers, snow blowers, JET SKI™s (personal watercrafts (PWCs)), motorcycles, snow mobiles, or the like, from one location to another by way of a land vehicle, such as a truck, van, recreational vehicle, or the like. Advantageously, when not in use the ramp system is conveniently removed from the vehicle and rolled up for compact storage.

Figure 1:
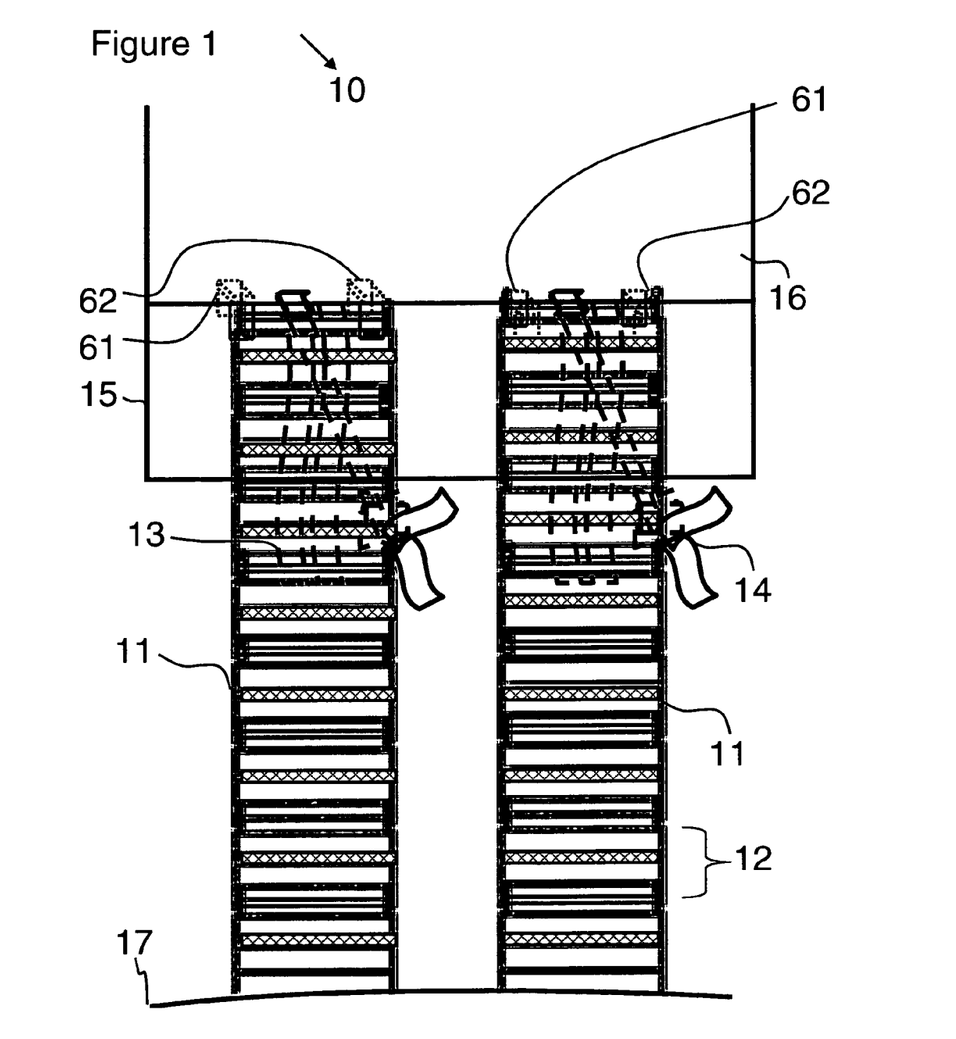
FIG. 1 is a schematic view of the Roll Up Ramp System in the ramp configuration showing the roll up ramp as a dual roll up ramp temporarily attached to a tailgate portion of a hauling vehicle.

FIG. 1 is a schematic view of the Roll Up Ramp System, generally shown at 10, showing the ramp configuration as a dual roll up ramp temporarily attached to a tailgate portion of a hauling device. A hauling device includes such devices as pickup trucks, sport utility vehicles, box trucks, and the like. A hauling device having a bed 16 and a tailgate portion 15 is shown. A roll up ramp 11, shown herein as dual roll up ramps 11, is temporarily attached to tailgate portion 15 by way of securement device 13. Securement device 13 is adapted for temporarily attaching the roll up ramp system 10 to the tailgate portion 15 of the hauling device. The securement device 13 comprises a heavy duty interwoven cloth material adapted to be secured by a temporary knot 14 under the tailgate portion 15 of the hauling device. Securement device 13 can also be wrapped around the tailgate portion 15 of the vehicle and secured to the underside of the ramp system 10.

Herein the securement device 13 is shown as dual heavy duty interwoven cloth material portions, or webbing, that run parallel to one another. The securement device 13 is interstitially connected throughout a portion of the roll up ramp, having excessive material disposed for slipping over the tailgate portion and being tied in a secure temporary knot 14 located under the tailgate portion 15. It can be fastened by use of a clip attached to the end of the webbing. Alternatively, the securement device 13 comprises a left hook 61 and right hook 62 composed of a steel, metal, or plastic material. The hooks 61 and 62, are adapted to be temporarily hooked between bed 16 and tailgate portion 15 of the hauling device. The roll up ramps 11 are easily attached to the tailgate portion 15 by the securement device 13 while the other end of the roll up ramps 11 are placed at ground level 17 so as to form an angled ramp entry into the bed 16. The roll up ramps 11 are comprised of a plurality of links 12. Each of the links 12 has a top surface and a bottom surface (top surface shown via this view, but bottom surface not shown).

Figure 2:
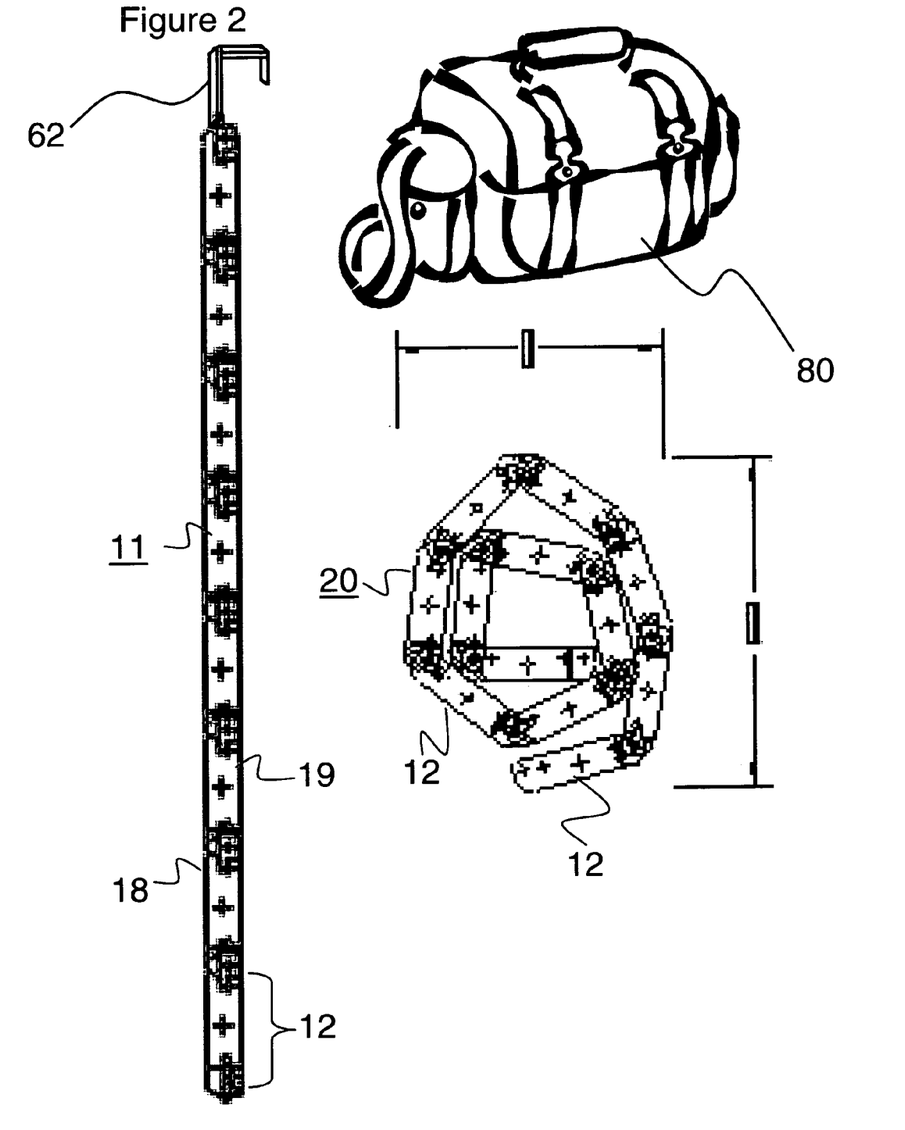
FIG. 2 is a lateral view of the Roll Up Ramp System in the ramp configuration and in the roll up configuration.

FIG. 2 illustrates a lateral view of the Roll Up Ramp System in the ramp configuration and in the roll up configuration, shown at 11 and 20, respectively. The side view of the ramp configuration 11 is shown having a plurality of links 12. Each of said plurality of links 12 has a top surface 18 and a bottom surface 19. The side view of the roll up configuration 20 is shown having a plurality of links 12 that are folded on top of one another. As force is applied to the bottom surface 19 of the links 12 in the ramp configuration 11, the links 12 rotate to yield the roll up ramp configuration 20. When the links 12 are unrolled and in the straightened or elongated position as the ramp configuration 11, a force is applied to the top surface 18 of the links 12 causing a rigid ramp configuration 11 to result.

Figure 3:
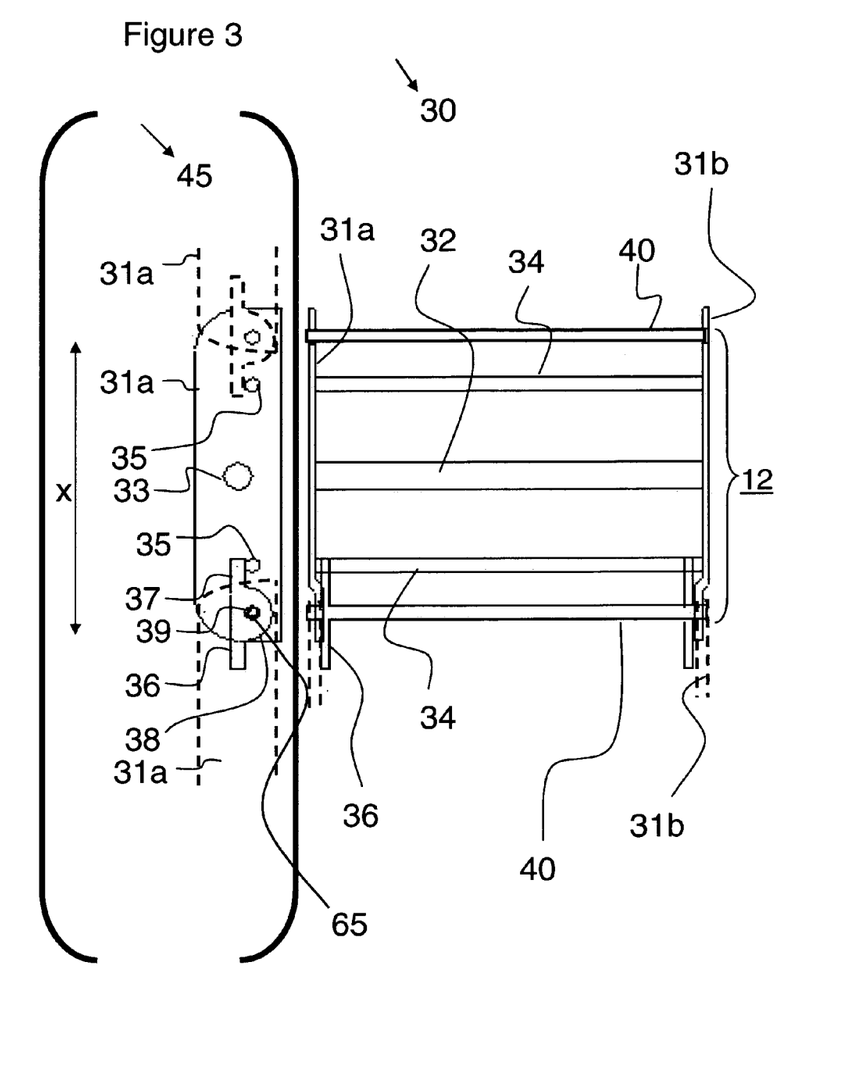
FIG. 3 is a schematic view of a single link that interconnects to form the roll up ramp.

FIG. 3 is a schematic view of a single link, shown generally at 30, that interconnects to form the roll up ramp. Each link 12 is formed by a set of parallel plates 31a and 31b (to demarcate a set) interconnected by a central support rod 32 and a pair of lateral locking rods 34. The lateral locking rods 34 extend horizontally between the set of parallel plates 31a and 31b. Selvedge linking units 36 are provided and interstitially connect links 12 (i.e. connect links adjacent to one another) to one another via linking support rods 40. The arrangement is better seen in FIG. 3 at 45. Each of the parallel plates 31*a* (and 31*b*) has a left end and a right end with a linking aperture 39 located thereon. Central support rod 32 is fixedly received by central aperture 33 located on the parallel plate 31*a*. Each of the lateral locking rods 34 is fixedly received by lateral apertures 35 located on the parallel plate 31*a* on opposing sides of the central aperture 33.

Selvedge linking units 36 having a locking portion 37 and a pivot portion 38 are included by the roll up ramp system. The pivot portion 38 has a pivot aperture 65 located centrally therein. This pivot aperture 65 is adapted to fixedly receive the linking support rod 40, and lines up with linking aperture 39. The set of parallel plates 31*a* and 31*b* concerning the next link 12 is interstitially attached by way of linking support rod 40, selvedge linking unit 36, and the left (or visa vie, the right) side of each parallel plate 31*a* and 31*b*. Each of the selvedge linking units 36 is fixed within the linking apertures 39 that are located on the left and right ends of each of the parallel plates 31*a* and 31*b*, which in turn line up with pivot aperture 65 of pivot portion 38. These selvedge linking units 36 are adapted to rotate in an extended position and a roll up position. The locking portion 37 of each of the selvedge linking units 36 is adapted to receive each of the lateral locking rods 34 when the selvedge linking units 36 are in the extended position. Additionally, the locking portion 37 of each of the selvedge linking units 36 is adapted to release each of the lateral locking rods 34 when the selvedge linking units 36 are in the roll up position. The locking portion may have more than 2 locking members, and the links may have more than 2 parallel plates, depending upon weight requirements. For roll up ramp constructions appointed to support heavy loads, the number of plates in each link can be as high as 4 or more.

The roll up ramp system's plurality of linking support rods 40 are received within the pivot aperture 65 of the pivot portion 38 of each of the selvedge linking units 36. These liking support rods 40 interconnect each of the links to form a roll up ramp (11 in FIG. 1). The roll-up ramp (11 in FIG. 1) is adapted to form a ramp configuration (see FIG. 2, at 11) and a roll up configuration (see FIG. 2, at 20) when force is applied. The links 12 are adapted to fold over one another when the selvedge linking units 36 are in the roll up position (see FIG. 2, at 20) and force is applied.

Each of the plurality of links comprising the roll up ramp system has a length ranging from ¼–1 feet (shown as x). Preferably, each of the links 12 comprising the roll up ramp system have a length ranging from ½–¾ feet. The central support rods 32, lateral locking rods 34, and linking support rods 40 may be coated with a non-skid surface material. Alternatively, the central support rods 32, lateral locking rods 34, and linking support rods 40 may have treaded grooves thereon. The non-skid surface material and treaded grooves serve to cause friction between the roll up ramp system and an object traversing the system (i.e. lawn mower, etc.) to provide optimum loading capability and minimize slippage.

The ramp configuration of the roll up ramp system is achieved when force is applied to the top surface of each of the links 12. As the force is applied to the top surface of each of the links 12, the selvedge linking units 36 become engaged and assume the extended position. In the extended position, the locking portion 37 of the selvedge linking unit 36 is received by each of the lateral locking rods 34 to form the ramp configuration (11 in FIG. 1).

The roll up configuration (see FIG. 2 at 20) of the roll up ramp system is achieved when force is applied to the bottom surface of each of the links 12. As the force is applied to the bottom surface of each of the links 12, the selvedge linking unit 36 rotates and its locking portion 37 is released by each of the lateral locking rods 34. As the selvedge linking units 36 rotate the links 12 fold over one another to form the roll up configuration (see FIG. 2 at 20).

Figure 4:
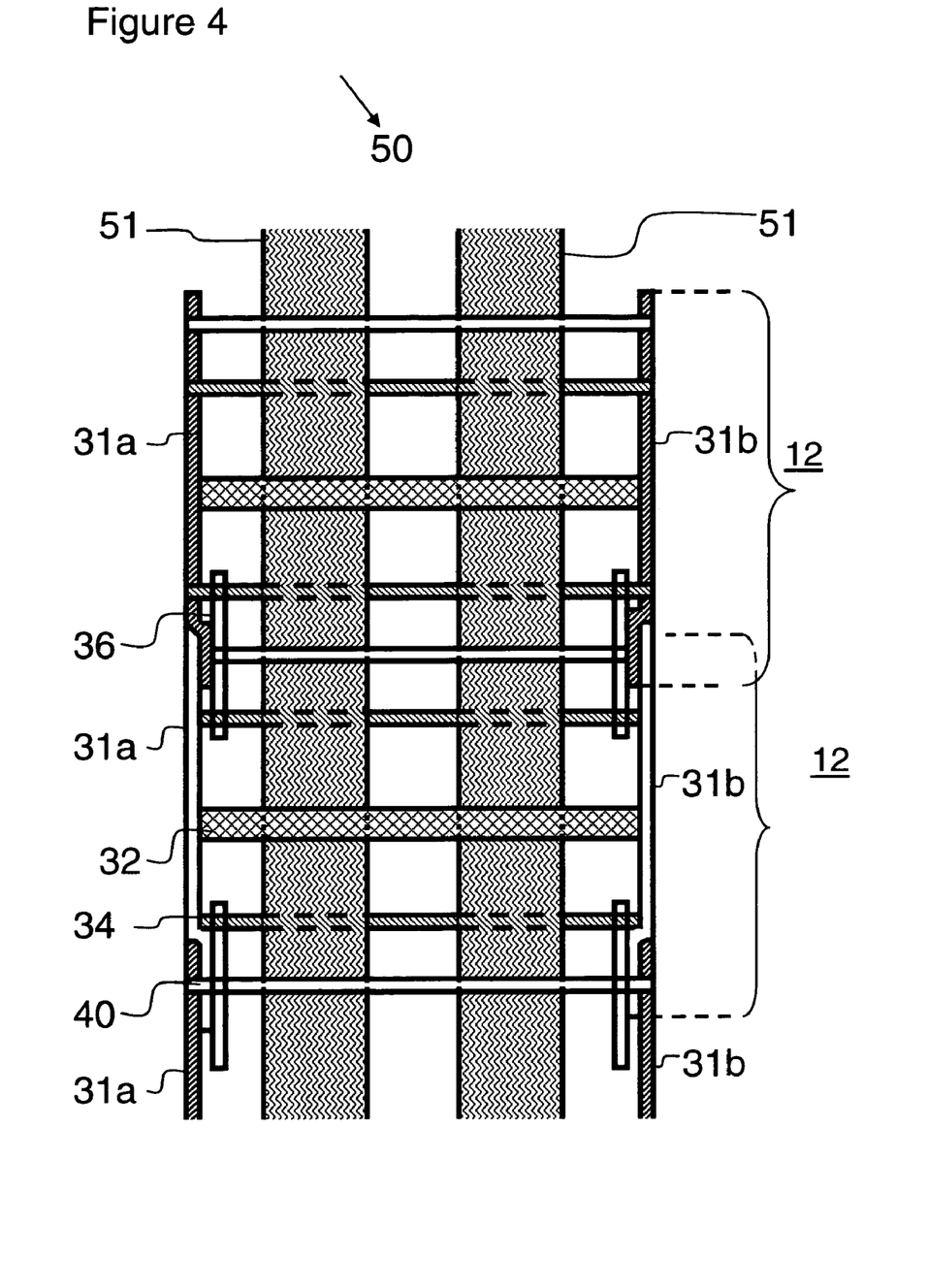
FIG. 4 is a schematic view of the Roll Up Ramp System showing a segment of the roll up ramp in the ramp configuration having an inner support system.

FIG. 4 illustrates is a schematic view of the Roll Up Ramp System showing a segment of the roll up ramp in the ramp configuration having an inner support system, shown generally at 50. This inner support system 50 provides an inner support 51 interconnected between the central support rods 32, the lateral locking rods 34, and the linking support rods 40. The inner support system 50 is shown herein as a dual inner support system. The dual inner support system is comprised of dual inner supports 51 running parallel to one another and being composed of a heavy duty interwoven cloth material, or webbing. Alternatively, the inner support system 50 may be a unilateral inner support system, composed of a heavy duty interwoven cloth material. The inner support 51 is alternately intertwined over, under and between the central support rods 32, the lateral locking rods 34, and the linking support rods 40 interconnecting parallel plates 31*a* and 31*b* of each link 12. Selvedge linking units 36 are also shown from this view. The inner support system 50 further extends between the set of parallel plates 31*a* and 31*b* and through the plurality of links 12 and extends throughout the roll up ramp system. The inner support 51 may be composed of an interwoven material fabric or an interwoven metal mesh material. Optionally, the inner support 51 is composed of an interwoven polymeric material. This inner support system 50 provides added support to the roll up ramp system while providing enhanced friction between the ramp and the machinery or object traversing the ramp. However, its primary purpose is to provide traction for loading. A traction surface may be also be attached to the top of the links. As a result, slippage of the machinery while traversing the ramp is minimized.

The roll up ramp system is composed of a light weight metal or plastic material. This light weight structure enhances the convenient nature of the roll up ramp system. That is to say, the light weight provides a light, durable, ramp structure that can be readily rolled up for storage and easily maneuvered when in the ramp or roll up configuration. Such a light weight structure is readily adapted for use as temporary ramping for wheelchair access to non compliant buildings. The roll up ramp system can be placed on stairs, for example, to accommodate wheelchairs as a temporary fix. Despite the light weight composition, the roll up ramp system displays remarkable load carrying capacity without sagging or structural damage.

The roll up ramp system can be comprised of dual ramps, or a single unilateral ramp. Where the roll up ramp system is comprised of a dual ramp system each ramp is spaced a distance apart that will accommodate the wheel width base of the equipment being loaded. The roll up ramp is light in weight and easily attached to the hauling device so that the user can readily move each of the ramps to accommodate the given wheel base of the machinery being loaded. When the roll up ramp system is comprised of dual roll up ramps, each ramp has a width ranging from ½–2.5 feet. Alternatively, the roll up ramp system is comprised of a unilateral ramp system. The unilateral ramp system is comprised of a unilateral roll up ramp that has a width ranging from 2–6 feet. These dimensions enable the roll up system to be utilized for a variety of machinery. The roll up ramp system is adapted to support a load associated with machinery selected from the group consisting of a lawn mower, rotary-tiller, fertilizer spreader, snow blower, snow mobile, JET SKI™s (personal watercrafts (PWC)), or an all terrain vehicle. Optionally, the roll up ramp system further comprises a storage bag shown as 80 in FIG. 2) adapted for housing the roll up ramp when the roll up ramp is in the roll up configuration. Advantageously, the Roll Up Ramp System is adapted to be rolled in one direction for storage, but locks when flexed in the opposite direction forming a durable ramp configuration.

Having thus described the invention in rather full detail, it will be understood that such detail need not be strictly adhered to but that various changes and modifications may suggest themselves to one skilled in the art, all falling within the scope of the invention as defined by the subjoined claims.

What is claimed is:

1. A roll up ramp system for temporary connection to a tailgate portion of a hauling vehicle, comprising:
   a. a securement device, said securement device temporarily connecting said roll up ramp system to said tailgate portion of said hauling device;
   b. a plurality of links each having a top surface and a bottom surface and being formed by a set of parallel plates interconnected by a central support rod and a pair of lateral locking rods each extending between said set of parallel plates, each of said parallel plates further having a left end and a right end with a linking aperture located on each of said left and right ends thereof;
   c. a plurality of selvedge linking units, each of which units having a locking portion and a pivot portion, said pivot portion having a pivot aperture, each of said selvedge linking units being fixed within said linking apertures located on each of said left and right ends of each of said parallel plates, each of said selvedge linking units being adapted to rotate in an extended position and a roll up position, said locking portion of each of said selvedge linking units being adapted to receive each of said lateral locking rods when said selvedge linking units are in said extended position, and said locking portion of each of said selvedge linking units being adapted to release each of said lateral locking rods when said selvedge linking units are in said roll up position;
   d. a plurality of linking support rods, each of said linking support rods being received within said pivot aperture of said pivot portion of each of said selvedge linking units and interconnecting each of said links to form a roll up ramp, said roll-up ramp being adapted to form a ramp configuration and a roll up configuration when a force is applied, said links being adapted to fold over one another when said selvedge linking units are in said roll up position and when said force is applied;
   e. said ramp configuration of said roll up ramp system being achieved when said force is applied to said top surface of each of said links, thereby engaging said extended position of each of said selvedge linking units and causing said locking portion to be received by each of said lateral locking rods; and
   f. said roll up configuration of said roll up ramp system being achieved when said force is applied to said bottom surface of each of said links, thereby engaging said roll up position of each of said selvedge linking units and causing said locking portion to be released by each of said lateral locking rods and said links to fold over one another.

2. A roll up ramp system for temporary connection to a tailgate portion of a hauling vehicle as recited by claim 1, wherein said securement device comprises a heavy duty interwoven cloth material adapted to be tied under said tailgate portion of said hauling device.

3. A roll up ramp system for temporary connection to a tailgate portion of a hauling vehicle as recited by claim 1, wherein said securement device comprises a left and right hook, said hook being adapted to be hooked under said tailgate portion of said hauling device and being composed of a steel, metal, or plastic material.

4. A roll up ramp system for temporary connection to a tailgate portion of a hauling vehicle as recited by claim 1, further comprising an inner support system interconnected between said central support rods, said lateral locking rods, and said linking support rods and extending between said set of parallel plates and being further interconnected between said links and extending throughout said roll up ramp system.

5. A roll up ramp system for temporary connection to a tailgate portion of a hauling vehicle as recited by claim 4, said inner support system being a unilateral inner support system and is composed of a heavy duty interwoven cloth material.

6. A roll up ramp system for temporary connection to a tailgate portion of a hauling vehicle as recited by claim 4, said inner support system being a dual inner support system, said dual inner support system being comprised of dual supports running parallel to one another and being composed of a heavy duty interwoven cloth material.

7. A roll up ramp system for temporary connection to a tailgate portion of a hauling vehicle as recited by claim 4, said inner support system being composed of an interwoven metal mesh material.

8. A roll up ramp system for temporary connection to a tailgate portion of a hauling vehicle as recited by claim 4, said inner support system being composed of an interwoven polymeric material.

9. A roll up ramp system for temporary connection to a tailgate portion of a hauling vehicle as recited by claim 1, said roll up ramp system being composed of a light weight metal material.

10. A roll up ramp system for temporary connection to a tailgate portion of a hauling vehicle as recited by claim 1, said roll up ramp system being composed of a light weight plastic material.

11. A roll up ramp system for temporary connection to a tailgate portion of a hauling vehicle as recited by claim 1, said roll up ramp system being comprised of a dual ramp system.

12. A roll up ramp system for temporary connection to a tailgate portion of a hauling vehicle as recited by claim 11, said dual ramp system being comprised of dual roll up ramps each having a width ranging from ½–2.5 feet.

13. A roll up ramp system for temporary connection to a tailgate portion of a hauling vehicle as recited by claim 1, said roll up ramp system being comprised of a unitary ramp system.

14. A roll up ramp system for temporary connection to a tailgate portion of a hauling vehicle as recited by claim 13, said unitary ramp system being comprised of a unitary roll up ramp having a width ranging from 2–6 feet.

15. A roll up ramp system for temporary connection to a tailgate portion of a hauling vehicle as recited by claim 1, said roll up ramp system is adapted to support a load associated with machinery selected from the group consisting of a lawn mower, rotary tiller, fertilizer spreader, snow blower, snow mobile, personal watercraft, or an all terrain vehicle.

16. A roll up ramp system for temporary connection to a tailgate portion of a hauling vehicle as recited by claim 1, said roll up ramp system further comprising a storage bag adapted for housing said roll up ramp when said roll up ramp is in the roll up configuration.

17. A roll up ramp system for temporary connection to a tailgate portion of a hauling vehicle as recited by claim 1, wherein each of said links has a length ranging from ¼–1 feet.

18. A roll up ramp system for temporary connection to a tailgate portion of a hauling vehicle as recited by claim 17, each of said links having a length ranging from ½–¾ feet.

19. A roll up ramp system for temporary connection to a tailgate portion of a hauling vehicle as recited by claim 1, said central support rods, lateral locking rods, and linking support rods being coated with a non-skid surface material.

20. A roll up ramp system for temporary connection to a tailgate portion of a hauling vehicle as recited by claim 1, said central support rods, lateral locking rods, and linking support rods having treaded grooves thereon.

21. A roll up ramp system for temporary connection to a tailgate portion of a hauling vehicle as recited by claim 1, said ramp system being additionally used for wheelchair access to a non-compliant building.

22. A roll up ramp system, for facilitating transition between a first elevation and a second, higher elevation, comprising:
   a. a securement device, said securement device temporarily connecting said roll up ramp system to said second, higher elevation;
   b. a plurality of links each having a top surface and a bottom surface and being formed by a set of parallel plates interconnected by a central support rod and a pair of lateral locking rods each extending between said set of parallel plates, each of said parallel plates further having a left end and a right end with a linking aperture located on each of said left and right ends thereof;
   c. a plurality of selvedge linking units, each of which units having a locking portion and a pivot portion, said pivot portion having a pivot aperture, each of said selvedge linking units being fixed within said linking apertures located on each of said left and right ends of each of said parallel plates, each of said selvedge linking units being adapted to rotate in an extended position and a roll up position, said locking portion of each of said selvedge linking units being adapted to receive each of said lateral locking rods when said selvedge linking units are in said extended position, and said locking portion of each of said selvedge linking units being adapted to release each of said lateral locking rods when said selvedge linking units are in said roll up position;
   d. a plurality of linking support rods, each of said linking support rods being received within said pivot aperture of said pivot portion of each of said selvedge linking units and interconnecting each of said links to form a roll up ramp, said roll-up ramp being adapted to form a ramp configuration and a roll up configuration when a force is applied, said links being adapted to fold over one another when said selvedge linking units are in said roll up position and when said force is applied;
   e. said ramp configuration of said roll up ramp system being achieved when said force is applied to said top surface of each of said links, thereby engaging said extended position of each of said selvedge linking units and causing said locking portion to be received by each of said lateral locking rods; and
   f. said roll up configuration of said roll up ramp system being achieved when said force is applied to said bottom surface of each of said links, thereby engaging said roll up position of each of said selvedge linking units and causing said locking portion to be released by each of said lateral locking rods and said links to fold over one another.

\* \* \* \* \*